United States Patent

[11] 3,554,484

| [72] | Inventor | Jean Gachot |
| | | 179, Avenue de la Division Leclerc, Enghien, France |
| [21] | Appl. No. | 730,268 |
| [22] | Filed | May 20, 1968 |
| [45] | Patented | Jan. 12, 1971 |
| [32] | Priority | June 2, 1967 |
| [33] | | France |
| [31] | | 108,920 |

[54] BETWEEN FLANGE BALL VALVE WITH COMPOSITE ANNULAR SEAL
4 Claims, 4 Drawing Figs.

| [52] | U.S. Cl. | 251/152, 251/315 |
| [51] | Int. Cl. | F16k 5/06, F16l 29/00 |
| [50] | Field of Search | 251/172, 174, 315, 148, 151, 152 |

[56] References Cited
UNITED STATES PATENTS

| 3,339,885 | 9/1967 | Scaramucci | 251/315X |
| 3,446,476 | 5/1969 | Scaramucci | 251/315X |
| 3,266,769 | 8/1966 | Shand | 251/315X |
| 3,356,337 | 12/1967 | Olen | 251/315 |
| 3,401,914 | 9/1968 | Shand | 251/315X |
| 3,394,915 | 7/1968 | Gachot | 251/315X |

FOREIGN PATENTS

| 978,601 | 12/1964 | Great Britain | 251/174 |

*Primary Examiner*—William R. Cline
*Attorney*—Young & Thompson

ABSTRACT: A ball valve which is intended to be mounted between the coupling flanges of a pipe and which comprises at least one composite annular seal having a metallic web fitted on the side adjacent to the internal orifice thereof with a packing seal which is adapted to come into contact with the ball. The composite annular seal is fitted along the outer edge thereof with a sealing ring formed of flexible material which is clamped at the time of assembly between the lateral face of the valve body and the adjacent pipe-coupling flange. Preferably the outer sealing ring has a U-shaped cross section and the outer edge of the web is engaged in the annular groove thus formed in said ring.

PATENTED JAN 12 1971 3,554,484
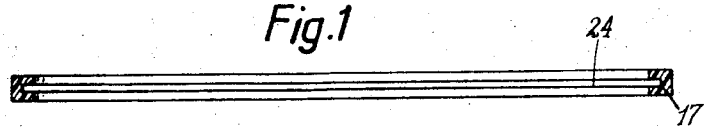
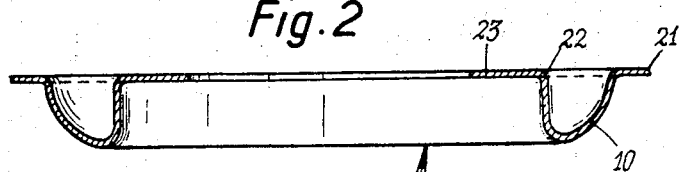
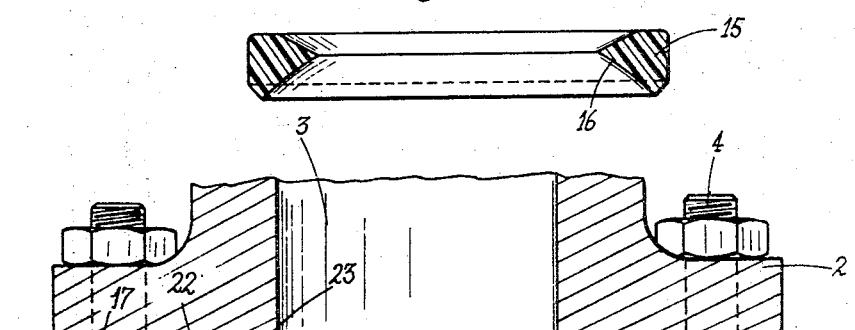
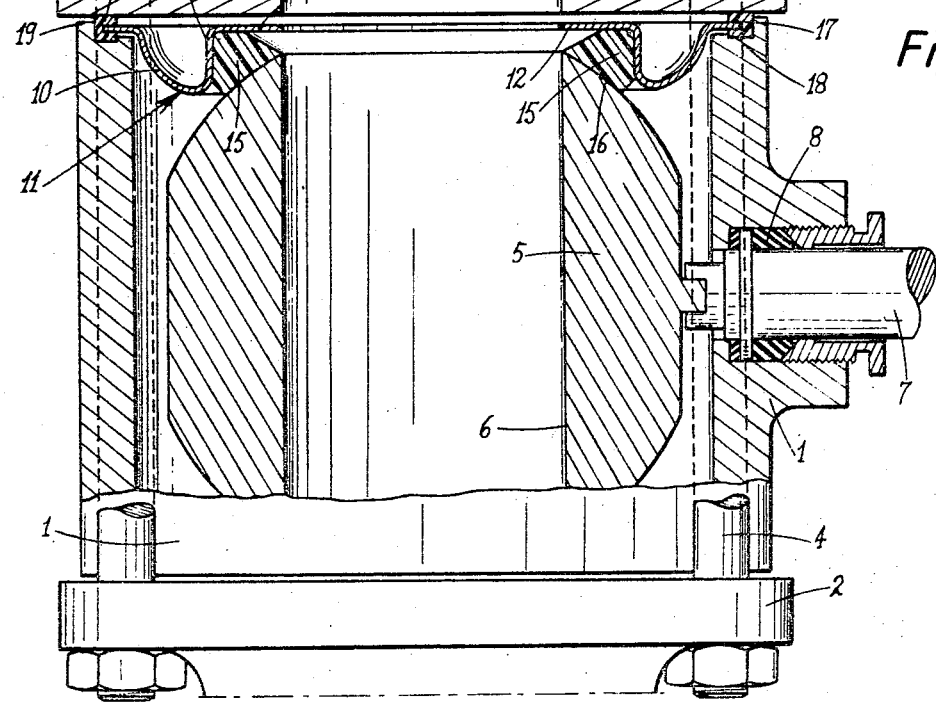
INVENTOR
JEAN GACHOT
By Young & Thompson
ATTYS.

BETWEEN FLANGE BALL VALVE WITH COMPOSITE ANNULAR SEAL

This invention is concerned with improvements to ball valves or cocks which are fitted with composite seals.

As is already known, ball valves or cocks comprise a closure member consisting of a spherical plug, or "ball", which is pierced by a diametral passageway, said plug being capable of rotating between two annular seals about an axis at right angles to that of the passageway.

Valves or cocks of this type have very advantageous properties but present technical difficulties in the design of annular seals. In this field, one annular seal of a known type comprises a shaped metallic web which is endowed with a small degree of elasticity and entirely covered by a sealing sheath. A seal of this type is wholly suitable for small-sized or medium-sized valves. It has also been proposed to made use of an uncovered web, thereby simplifying manufacture and resulting in a valve of highly rugged design.

There has also been described in the literature a seal having a flexible metallic web comprising a packing seal of plastic material which is intended to come into contact with the ball whilst the outer portion of the web which is applied against the valve body and against the adjacent pipe-coupling flange is uncovered. A composite seal of this type offers the advantage of permitting an appreciable increase in the diameter of the valve without either increasing its fragility or inflating the cost price of the seal.

Seals of this type prove satisfactory under the usual industrial conditions of utilization. However, experience has shown that, in the case of ball valves of large size or of valves which are called upon to operate under very high pressures or under a very high vacuum, leak tightness along the outer edge of the seal was liable to prove insufficient.

The object of the present invention is to provide a simple remedy for the disadvantages which have been outlined.

In accordance with the invention, the ball valve which is intended to be mounted between the coupling flanges of a pipe and which comprises at least one composite annular seal having a metallic web fitted on the side adjacent to the internal orifice thereof with a packing seal which is adapted to come into contact with the ball is characterized in that the composite annular seal is provided along the outer edge thereof with an added sealing ring formed of flexible material which is clamped at the time of assembly between the lateral fact of the valve body and the adjacent pipe-coupling flange.

In accordance with a preferred embodiment, the outer sealing ring has a U-shaped cross section, the outer edge of the web being engaged in the annular groove thus formed in said ring.

Preferably, the sealing ring is partly inserted in a channel formed in the lateral face of the valve body so as to project from said lateral face to a slight extent. The outer edge of the metallic web is thus gripped by the sealing ring which is in turn clamped between the valve body and the adjacent pipe-coupling flange.

Other properties and advantages of the invention will become apparent from the description given hereinafter, particularly with regard to the groove and seal.

A preferred embodiment of the invention is illustrated in the accompanying drawings, in which:

FIG. 1 is a diametral sectional view of the sealing ring alone;

FIG. 2 is a diametral sectional view of the metallic web of the composite seal;

FIG. 3 is a diametral sectional view of the packing seal;

FIG. 4 is a view of the ball valve as shown partly in axial cross section and partly as an external view.

Referring now to FIG. 4 of the accompanying drawings, there is shown a ball valve comprising a body 1 of large diameter (for example 20 to 30 centimeters) which is clamped between two coupling flanges of a pipe or duct 3 by means of tie bolts 4. The closure member is constituted in known manner by a spherical ball 5 pierced by a diametral passageway 6 which is located in the line of extension of the duct in the open position and at right angles thereto in the closed position. The rotation of the ball 5 is controlled by a rod 7 which passes through a packing-gland seal 8 flanges 2. The composite of the valve body 1.

The ball 5 is held within the valve body 1 by means of two composite seals 11 which are housed within said body and interposed between said ball and the pipe-coupling flanges 2.

The composite seal 11 comprises is known manner a shaped annular metallic web 12 which is formed, for example, of stainless steel.

The central portion of the web 12 comprises a toric zone 10 (as shown in FIG. 2), the concave portion of which is directed towards the adjacent pipe-coupling flange 2. The zone 10 is joined to an outer edge constituted by a straight annular flange 21 located in a plane at right angles to the axis of the valve. On the inside, the zone 10 is joined to a right-angled shoulder 22 which terminates in a second annular flange 23 located substantially in the same plane as the annular flange 21. The web 12 can thus be shaped by die-stamping a flat washer.

The annular shoulder 22 is intended to imprison a flexible annular packing seal 15 (as shown in FIG. 3) which is formed of flexible material such as, for example, polytetrafluoroethylene. Said annular packing seal comprises a concave toric zone 16 which is maintained applied elastically against the ball 5 under the action of the web 12.

The seal 11 additionally comprises a sealing ring 17 (as shown in FIG. 1) which has a U-shaped cross section and sharp edges, the annular groove 24 of said seal being directed towards the axis. The sealing ring 17, which is also formed of flexible material as in the case of the seal 15, is mounted astride the outer annular flange 21 of the web 12 and can be fitted in position by virtue of the elastic deformation of the material of which is is formed.

In addition, the sealing ring 17 is partially inserted within a channel 18 which is formed in the lateral face 19 of the valve body 1. The depth of said channel is such that, after positioning within said channel, the seal projects from the face 19 to a slight extent. The outer face of the sealing ring 17 is also intended to come into contact with the pipe-coupling flange 2.

Accordingly, the packing seal 15 and the sealing ring 17 which are mounted on the web 12 constitute a single composite seal in which the sealing components are secured to the web, thereby considerably simplifying handling operations. At the time of assembly, it is merely necessary to insert the sealing ring 17 in the channel 18 for the purpose of fixing the seal 11 in a good position without any danger of displacement of one of its components, this being achieved in spite of the small depth of the channel 18.

Operations which entail mounting the valve in a duct and removal therefrom are highly simplified.

Clamping of the sealing ring 17 between the valve body 1 and the pipe-coupling flange 2 makes it possible to obtain a high value of lateral leaktightness in the particularly difficult cases of large-sized valves which operate under high pressures or under a very high vacuum.

Leaktightness of the packing seals 15 which are in contact with the ball is enhanced by tightening of the tie rods 4. In fact, the flattening of the sealing ring 17 as a result of clamping of this latter between the channel 18 and the pipe-coupling flange 2 tends to bring the web 12 closer to the ball 5, thereby increasing the elastic thrust applied by the packing seal 15 against the surface of the ball.

The surprising technical effect which is achieved by the invention has been demonstrated experimentally. The following numerical examples can consequently be given and correspond to the utilization of a sealing ring 17 of polytetrafluoroethylene.

|  | Valve I | Valve II |
| --- | --- | --- |
| Diameter of valve body in mm | 100 | 160 |
| External diameter of sealing ring 17 in mm | 96 | 156 |
| Internal diameter | 89.4 | 149.4 |
| Diameter of base of groove 24 in mm | 94.5 | 154.5 |
| Transverse width of groove 24 in mm | 1.2 | 1.7 |
| Thickness of sealing ring in mm | 4.1 | 4.6 |
| Depth of insertion in valve body in mm | 0.5 | 1.7 |

The valve I withstands a pressure of 140 kgs/cm². A similar valve provided with a sealing ring formed of the same material and simply inserted in a channel of the valve body and pressed down by the pipe-coupling flange but without any connection with the annular seal 11 which holds the ball 5 exhibits leakage at a pressure of 70 kgs/cm².

In the case of the valve II, the operating pressure can attain 120 kgs/cm² whereas an ordinary sealing ring of the type mentioned would develop a leak at 30 kgs/cm².

This improvement in the behavior of the seal is all the more surprising since the rim 21 of the seal does not play a part in holding the sealing ring 17 in position.

The cross-sectional configuration of the sealing ring need tot be that of the U but can be circular, for example, in which case the sealing ring can again be provided with an internal annular groove to permit the insertion of the annular flange 21.

Similarly, the web of the composite seal can have undulations which differ in cross section from the shape described above the packing seal also can have a different cross section. However, preference is given to the embodiment hereinabove described by reason of its inherent simplicity and effectiveness.

I claim:

1. A ball valve to be mounted between the coupling flanges of a pipe, said valve comprising a hollow body containing a closure ball and terminating in two annular end faces, at least one annular seal comprising a metallic web having an annular outer edge and being internally in sealing contact with said ball, an outer sealing ring of elastic deformable material having a U-shaped cross section and having a radially inwardly opening annular groove therein with said annular outer edge of said web disposed in said groove, one of said end faces of said body having an annular channel therein in which said sealing ring is disposed, said channel opening in a direction axially away from said body and having a radially outer wall and a radially inner wall, said radially outer being longer in an axial direction than said radially inner wall 2. A valve as claimed in claim 1, said sealing ring being of polytetrafluoroethylene.

3. A valve as claimed in claim 1, a part of said sealing ring projecting axially beyond the associated said end face.

4. A valve as claimed in claim 1, said sealing ring projecting beyond said radially outer wall.